Dec. 17, 1968  A. JOHANSSON  3,417,291
RELAY PROTECTION MEANS FOR HVDC-TRANSMISSION SYSTEM
Filed April 22, 1966

INVENTOR
ARNE JOHANSSON
BY
Bailey, Stephens + Huettig
ATTORNEY 3,417,291
RELAY PROTECTION MEANS FOR
HVDC-TRANSMISSION SYSTEM
Arne Johansson, Ludvika, Sweden, assignor to Allmänna
Svenska Elektriska Aktiebolaget, Vasteras, Sweden, a
corporation of Sweden
Filed Apr. 22, 1966, Ser. No. 544,472
Claims priority, application Sweden, Apr. 23, 1965,
5,277/65
5 Claims. (Cl. 317—33)

ABSTRACT OF THE DISCLOSURE

A HVDC-transmission system has a rectifier station and an inverter station connected by a D.C. link. For protecting the D.C. link, an undervoltage sensitive means connected to the link gives a control signal upon a drop in the voltage below a certain limit which in turn controls an arrangement for giving a releasing signal to the rectifier station. A time derivative means sensitive to negative time derivatives of the voltage of the D.C. link is arranged in parallel to the undervoltage sensitive means between the D.C. link and the means for giving the releasing signal. This time derivative means supplies a signal to the undervoltage sensitive means which lasts for a certain length of time to prevent the continuance of the releasing signal for a long enough time to allow the current to build up in the D.C. link. Counting means is provided which after a certain number of successive interruptions will maintain the releasing signal.

---

Figure 1:
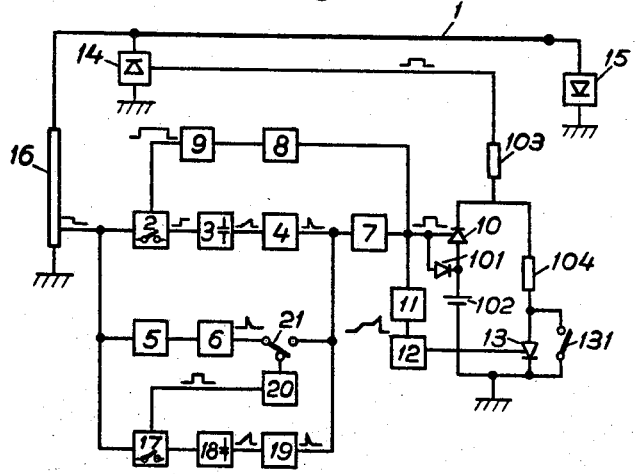

The present invention relates to a relay protection means for a direct current transmission system preferably for high voltage between a rectifier and an inverter station.

The converter stations used in direct current transmissions are generally provided with current regulators for presetting a certain required current in the stations, which current regulators influence the delay angle control system of the stations and thereby also their voltages. In the event of an earth fault on the transmission line the current regulator in the feeding rectifier station will, due to the current increase occurring with the earth fault, reduce the voltage of the rectifier station in order to limit the current in the rectifier station to the value set in the current regulator. This voltage decrease continues until the sum of the current of the inverter station and the current in the earth fault is equal to the current value set in the rectifier station which means that the current of the earth fault is equal to the difference between the current settings in the two stations, the so-called current margin. Thus it is simple to use the reduced line voltage as an indicator for an earth fault.

Voltage drops on the transmission line can, however, be due to other causes than line faults. Switching oscillations can for example cause transient, possibly periodic, voltage drops and a valve fault in a converter station produces a voltage oscillation on the D.C. line of the same frequency as that of the A.C. network which is connected to the station in which the valve fault occurs. The present invention relates to an earth fault protection means which is sensitive to the transmission voltage but which is at the same time selective to such voltage drops which are independent of earth faults. A similar selective voltage sensitive earth fault relay protection has been described in the U.S. Patent application Ser. No. 349,819, filed Mar. 6, 1964, now Patent No. 3,331,990.

The construction of the protection means according to the present invention is, however, somewhat more simple and it has a somewhat quicker operation and offers in most cases a selectivity as good as that described in the said patent application.

The protection according to the present invention is based on level time criterion, that is it releases if the line voltage during a certain period falls below a certain level. If, on the other hand, the voltage drop only is of a shorter duration the operation of the protection means which has been started is cancelled. In addition to this the protection means can in a simple way be supplemented with a time derivative protection means for immediate or delayed release in the event of a rapid voltage decrease which occurs for example at an earth fault in the vicinity of the feeding rectifier station.

A protection means according to the invention is characterised in that it is formed like a voltage-level-time indicator comprising a voltage level sensing device connected to the line voltage and arranged to deliver an output signal as long as the line voltage is below a certain predetermined voltage level. Furthermore the voltage-level-time indicator comprises a time measuring device for measuring the duration of said output signal and possible conversion of this duration into a suitable parameter and a time sensing device arranged to give a releasing signal when said parameter reaches a certain value.

The character of said releasing signal is in itself of no importance for the basic principle of the invention. In a D.C. transmission it is, however, in the event of a fault, suitable to cause a temporary blocking of the rectifier station or still better transferring of the rectifier station to inverter operation in order to obtain a rapid discharge of the energy stored in the transmission line and thereby quickly make the earth fault currentless and deionized. After the temporary blocking of the rectifier station the normal control means of the rectifier station will transfer the station to normal voltage so that if the fault has been eliminated by the brief blocking the transmission can continue its normal operation.

It is, therefore, suitable to form the protection means for such a brief blocking or transferring of the rectifier station, according to a further development of the invention, in such a way that the protection means comprises a pulse generator, for example a blocking oscillator, between said releasing device and the control system of the rectifier station for deriving from said first mentioned releasing signal a pulse of a certain predetermined length, which pulse is supplied to a blocking circuit in said control system for the rectifier station, for instance as shown in said patent application Ser. No. 349,819.

Figure 2:
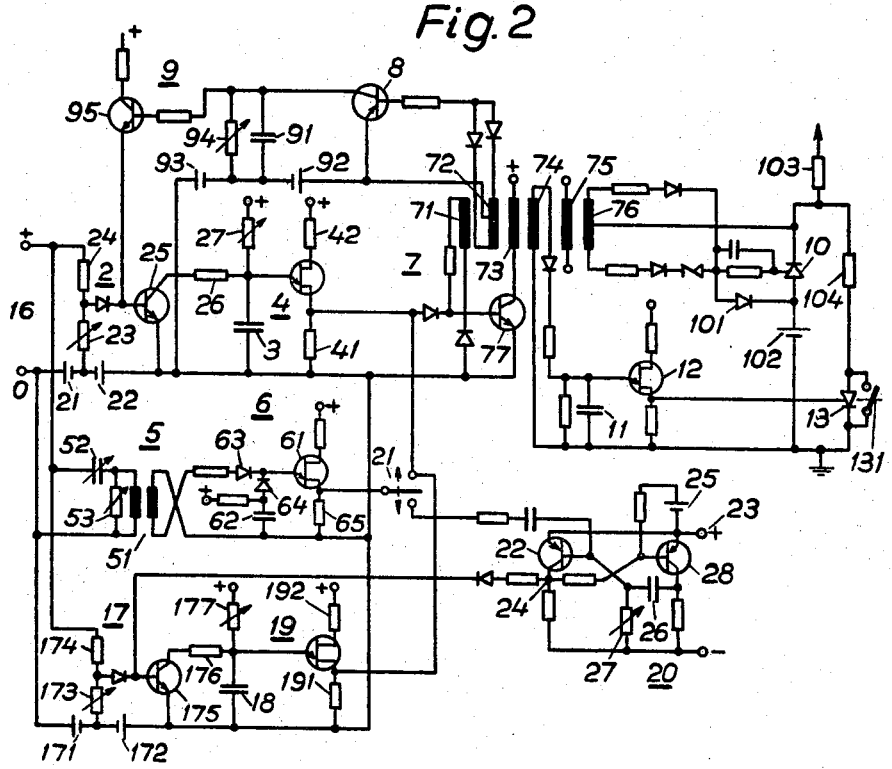

The invention will further be described with reference to the enclosed drawing, where FIG. 1 shows a block diagram of a D.C. transmission provided with a relay protection means according to the invention while FIG. 2 shows a schematic circuit diagram of the relay protection means.

FIG. 1 shows a transmission line 1 connecting a rectifier station 14 and an invert station 15. Furthermore a voltage divider 16 is connected to the D.C. line 1 from which voltage divider a reduced voltage proportional to the line voltage is connected to the voltage-level-time indicator of the protection means comprising the components 2, 3 and 4. The component 2 has simply the character of a switching device which, when the voltage from the voltage divider 16 is below a certain level, gives an output signal, for example a constant voltage, to the time measuring component 3 which can have the character of a capacitor. The voltage over this capacitor will, therefore, constitute a parameter for the duration of the signal coming from the component 2. The size of the signal from the component 3 is measured by the device 4 which gives a signal, when said magnitude reaches a certain value, for example a peak impulse to the pulse generator 7 which converts the peak impulse to a pulse of a certain duration. This pulse is fed to the control electrode of a thyristor 10 inserted in a circuit between the earth and the control system of the rectifier station 14. After the thyristor has become conducting the rest of the pulse from the pulse generator 7 will go through the main circuit of the thyristor 10 and the diode 101. In said circuit a voltage source 102 is inserted and a resistor 103 which is so large that the voltage source 102 is not able to keep the thyristor 10 conducting when the pulse from the pulse generator 7 ceases. The rectifier station will, therefore, receive a blocking signal of the same duration as the pulse from the pulse generator 7. After this pulse has ceased it will therefore be possible for the control system of the rectifier station to transfer the rectifier station to normal voltage if the earth fault has been eliminated during the blocking time.

In order to prevent the protection means from releasing during the time necessary for the line voltage to grow up after the blocking time to a level above the release level of the protection means, the protection means should be blocked for a certain time after the blocking impulse from the pulse generator 7 has ceased. For this purpose the protection means has been provided with a feedback circuit 8, 9 which as a matter of fact consists of a device for prolongation and possibly amplification of the pulse coming from the generator 7. The prolonged pulse coming from the device 9 is fed to the input side of the component 2 and will in this component simulate a line voltage of normal size. When said prolonged pulse has ceased the device 2 can measure the real value of the line voltage and in the event of an earth fault still existing it gives a new releasing signal through the components 3, 4 and 7. Thus upon a permanent earth fault the protection means will give a series of blocking impulses to the rectifier station 14.

If, after a number of such disconnections and attempts of connection, the earth fault has not been eliminated, the recitifier station and the whole transmission should be permanently blocked, and the protection means is therefore provided with a computer which, after for example two or three releases, causes a permanent blocking of the transmission system. Said computer consists of the components 11 and 12, where 11 is an integrating device, for example in the form of a capacitor, the voltage of which is proportional to the number of pulses from the pulse generator 7. Said capacitor voltage is measured by means of the component 12 which in response to a certain value of the said capacitor voltage gives an impulse to the thyristor 13, which thereby becomes conducting. The components 11 and 12 are so adapted that the control pulse to the thyristor 13 is given at a time when the thyristor 10 is conducting. Thus the voltage source 102 and the resistor 104, as well as the thyristors 10 and 13, will form a closed circuit and the resistor 104 is so small that said circuit continues to be conducting, and thus a permanent blocking voltage is fed to the control system of the rectifier station 14. After the permanent fault has been observed and necessary steps have been taken for its repair, the blocking pulse from the protection means can be disconnected which may be done by means of the contact 131 which is connected in parallel with the thyristor 13. By short circuiting the thyristor 13 by means of said contact, this thyristor will be currentless and when the contact is opened again the circuit over the voltage source 102 and the thyristor 10 is broken. After this the protection means is ready for operation when voltage is fed to the line.

FIG. 2 shows an example of a circuit diagram for the components 2-13, where the figures correspond to the figures in FIG. 1. The voltage from the voltage divider 16 is fed to the terminals in the left side of the figure. The voltage level sensitive device 2 comprises a transistor 25 the control electrode of which is connected to a voltage divider consisting of two resistors 23, 24 connected to the input terminals of the protection means through a voltage source 21. The voltage source 21 is so connected that its voltage is added to the voltage from the voltage divider 16. Further a voltage source 22, preferably of the same size as the voltage 21, is inserted in the control circuit. At normal line voltage the total voltage from the voltage divider 16 and the voltage source 21 exceeds the voltage source 22 in the control circuit of the transistor 25, thereby making the transistor 25 conducting. The transistor 25 in series with a resistor 26 thus short circuits the capacitor 3 so that a positive voltage connected to the variable resistor 27 will give a current through the transistor 25. If the line voltage drops to a certain level, the value of which can be predetermined by means of the variable resistor 23, the voltage source 22 exceeds the voltage from the voltage divider 23, 24, thereby blocking the transistor 25. This means that the capacitor 3 is charged by the voltage from the resistor 27. During transient voltage drops the transistor will soon be opened again thereby discharging the capacitor 3 over the resistor 26 and the transistor 25. The voltage of the capacitor 3 will thus constitute a parameter for the time during which the transistor 25 has been blocked, that is the time during which the line voltage has been under the predetermined level. In order to obtain a rapid discharge of the time measuring capacitor 3 after transient drops in the line voltage the resistor 26 should be low in comparison with the variable resistor 27.

If, on the other hand, the drop in the line voltage is of a more permanent nature the capacitor will be charged and, when its voltage exceeds a value preset by means of a unijunction transistor 4 and its positive feeding voltage, the capacitor 3 will be discharged through the unijunction transistor. This will thus operate as a time measuring device, which over the resistor 41 will give a voltage pulse when the decrease in the line voltage has reached a certain permanency. The time during which said decrease must appear in order to give a release is set by means of the variable resistor 27.

It should be possible simply to use the short pulse over the resistor 41 as a release signal for a blocking or transferring of the rectifier station. As mentioned earlier, it is, however, suitable to give the releasing signal a character suitable for the transmission and therefore the pulse generator 7 in the form of a blocking oscillator is inserted. The blocking oscillator comprises a transformer with a number of windings 71-76 and a transistor 77 connected in series with the primary winding 73 of the transformer. The transformer is furthermore provided with a premagnetizing winding 75. The pulse appearing over the resistor 41 is connected to the base electrode for the transistor 77, a current thereby occurring in the main winding 73 of the transformer. This current will give rise to a voltage in a first secondary winding 71 in the transformer, which voltage is connected to the control electrode of the transistor, the transistor thus being conducting as long as voltage is induced in the winding 71, that is until the current in the main winding 73 reaches the limit of saturation. When this happens the transistor 77 will be blocked, the current in the main winding 73 is interrupted and the transformer will be remagnetized by the premagnetizing winding 75. In the secondary winding 76 a cycle of an alternating current will thus be induced, which through the intermediate terminal and two end terminals with appertaining diodes is rectified and brought to the control electrode of a thyristor 10. When the thyristor 10 has become conducting the rest of the rectified pulse from the winding 76 will pass through the diode 101 and the main circuit of the thyristor 10. In order to obtain a fixed value of the voltage induced in the winding 76 during the remagnetizing of the transformer, a Zener diode is inserted in series with the lower diode of the winding. As long as the thyristor 10 is kept conducting by the blocking oscillator 7 the voltage source 102 will give a positive blocking voltage to the control system of the rectifier station. The resistor 103 has, however, been chosen so high that the voltage source 102 is not able to keep the thyristor conducting when the pulse from the blocking oscillator ceases. It is therefore possible for the control system of the rectifier station to increase the line voltage to the normal value, when said pulse ceases.

In order to prevent the protection means from being actuated and thus blocking the rectifier station before the line voltage has grown up to its normal value, the circuit 8, 9 is inserted. The first part of this circuit simply consists of a transistor 8, the control circuit of which is connected to the rectifier voltage from the winding 72 in the oscillator 7. As long as the pulse from the oscillator 7 occurs over the control circuit of the transistor 8, this transistor will be conducting, the voltage source 92 thereby charging the capacitor 91 in the device 9. When the voltage of the capacitor 91 exceeds the voltage 93, which is relatively low in comparison with the voltage 92, the capacitor 91 will give control voltage to the cascade-connected transistors 95 and 25. This means that a positive voltage will be connected to the base electrode of the transistor 25 through the main circuit of the transistor 95 and as long as the transistor 95 is kept conducting by the voltage of the capacitor 91 the voltage sensing device 2 will therefore react as if the line voltage is normal, that is, due to the voltage over the capacitor 91, the protection means will be blocked also a certain time after the pulse from the blocking oscillator 7 has ceased. By selecting the dimensions of the capacitor 91 and its variable discharge resistor 94 it is thus possible to predetermine for how long time the protection means should be blocked and thereby ensure that the line voltage will have time to grow up to its normal value if, during the blocking pulse from the voltage source 102, the fault has been eliminated.

If, however, the fault still exists the protection means will operate as soon as the voltage of the capacitor 91 is lower than the voltage 93, the protection means giving a new blocking impulse to the rectifier station through the resistor 103. In order to predetermine the number of releasing and reclosing attempts upon a permanent fault, the computer 11, 12 is connected to a winding 74 in the blocking oscillator 7. The computer 11 consists of a capacitor connected in parallel with a large discharging resistor, the voltage of this capacitor thereby gradually increasing at each blocking pulse from the blocking oscillator 7. When said voltage of the capacitor has reached a certain value the capacitor will discharge through the unijunction transistor 12 and its voltage divider, thereby giving a control pulse to the thyristor 13 inserted in series with the voltage 102 and the thyristor 10 and a resistor 104. Thus a permanently closed current circuit for the voltage 102 will be formed, thereby giving a blocking voltage through the resistor 103 to the rectifier station. In order to be able to cancel said blocking voltage after suitable measures have been taken, the thyristor 13 has, as mentioned previously, been parallel connected with a contact 131.

Upon distinct line faults, such as low-ohmic earth faults or earth faults in the vicinity of the rectifier station, the selective delay obtained by the devices 2, 3 and 4 is in most cases unnecessary, and therefore a quick release by means of a time derivative protection means 5, 6 should suitably be inserted. The derivative protection means 5, 6 is connected in parallel with the selective protection means 2, 3, 4 between the input of the protection means and the blocking oscillator 7, and consists of a pulse transformer 51, the primary side of which is connected in series with a variable capacitor 52 and in parallel with a variable resistor 53. At large negative time derivatives in the line voltage a voltage is induced in the secondary winding of the transformer 51, which voltage is connected to a unijunction transistor 61 over a diode 63. A capacitor 62 charged to a lower voltage will thereby discharge over the diode 64 through the unijunction transistor 61 and the resistance 65, a short impulse thereby being given to the control circuit of the transistor 77 in the blocking oscillator 7 which thereby starts without delay. By means of the capacitor 52 and the resistor 53 it is possible to preset the magnitude of the derivative which will give rise to the rapid release.

If the D.C. transmission comprises more than one transmission line, for example is formed as a two-pole transmission, each of the transmission lines should be provided with its own earth fault protection means according to the invention. In such a case, however, instantaneous release from the derivative circuit cannot be tolerated due to mutual influence of the lines on each other.

If an earth fault occurs in a line parallel to the D.C. line 1, for example the second pole in a two-pole D.C. transmission, a voltage is induced in the D.C. line 1 which voltage influences the derivative protection means 5, 6 in the same way as an earth fault if the induced voltage has a sufficiently large negative time derivative. The induced voltage is, however, usually of a very short duration in comparison with an earth fault in the D.C. line 1, so that a voltage level-time-circuit can indicate whether the derivative is due to an induced voltage or a common earth fault.

For this purpose the circuit 17–20 is inserted by means of the switching contact 21 between the derivative means 5, 6 and the pulse generator 7. In unipolar operation with only one transmission line the switching contact 21 will be in its upper position while in two-polar operation the switching contact will be in its lower position. At a purely unipolar transmission the components 17–21 are superfluous.

The signal from the derivative protection means 5, 6 starts a pulse generator 20, which for a short time opens the voltage-level-time-circuits 17, 18. The pulse generator 20 is built up as a bistable connection with two transistors 22 and 23 connected to a voltage source 23. Under normal conditions, that is when no signal is received from the derivative means 5, 6, the transistor 22 is conducting due to the fact that the voltage source 23 gives current both through its base circuit and main circuit. The point 24 will therefore have a positive potential which cooperates with the potential from the terminals 16, the transistor 175 in the device 17 thereby being conducting. The devices 17–19 are quite equivalent to the level-time-circuit 2–4 and as long as the point 24 is positive no signal will be given from 19 to the pulse transducer 7.

If the derivative means 5, 6 gives a pulse to the device 20 the transistor 22 will be blocked due to positive base voltage from said pulse. The point 24 becomes negative and the transistor 28 receives a base current from 23 despite the bias from 25. The transistor 28 thereby becomes conducting and the capacitor 26 will be charged through the variable resistor 27. During this charge the transistor 22 will keep its positive base potential and will thereby be blocked. Dependent on the time constant for the circuit 26, 27 the point 24 will therefore be negative during a certain period.

When the point 24 becomes negative its contribution to the positive bias of the transistor 175 disappears. If at the same time the line voltage is lower than the threshold value given by the circuit 171–174 the transistor 175 will be blocked and the capacitor 18 charged. After a certain time the device 19 will therefore give a pulse to the device 7 which thereby releases according to the process for the level-time-circuit 2–4 described above.

If, on the other hand, the line voltage does not keep the said low level during all the time given by 18 and 19 the transistor 175 will become conducting and the operation is interrupted.

It can be seen that correct operation according to the preceding description demands that the time constant for the capacitor circuit 26, 27 is larger than the time of operation for the circuit 17–19. On the other hand the duration of the voltage induced by a fault in a parallel line, which voltage gave rise to the signal from the derivative means, is so short that the operation time for the device 17–19 can be chosen rather low. The delay in the derivative means made by the circuit 17–19 can therefore be small in comparison with the delay in the circuit 2–4.

Expressed in figures the delay in the level-time-circuit 2–4 must be longer than or equal to the period time of the A.C. networks connected to the transmission in order to avoid release at valve faults. With a frequency of 50 cycles per second where the period time is 20 ms., said time of delay is suitably chosen to be about 20–50 ms.

The undervoltage induced in a faultless conductor due to a fault in a parallel line has, based on experience, a duration of 1–4 ms. A delay time of about 5 ms. in the circuit 17–19 is therefore sufficient to ensure against unnecessary releases in a faultless conductor due to a fault in a parallel conductor. The delay in the circuit 17–20 will therefore be about one order of magnitude smaller than the delay in the circuit 2–4. The time constant for the circuit 26, 27 should thus be chosen to be about 5–10 ms.

It is seen that the circuit diagram only is to be taken as an example of a protection means according to the invention. In principle the device 2 may be regarded as an undervoltage relay while the capacitor 3 can be regarded as a time measuring device, for example a timer, and the device 4 can be understood as a contact device influenced by said timer.

I claim:

1. In a HVDC-transmission system comprising a rectifier station and an inverter station and a D.C. link connecting said stations, relay protection means for said D.C. link comprising undervoltage sensitive means connected to said D.C. link for giving a control signal when the direct voltage of said D.C. link falls under and remains below a predetermined value for a certain time, means connected to said undervoltage sensitive means for giving a releasing signal to said rectifier station in response to a control signal from said undervoltage sensitive means, and time derivative means connected in parallel to said undervoltage sensitive means between the said D.C. link and said releasing signal giving means, said time derivative means comprising means sensitive to negative time derivatives of the voltage of said D.C. link to supply a signal to said releasing signal giving means in response to a predetermined value of said negative time derivative.

2. Relay protection means according to claim 1, said releasing signal giving means comprising pulse generator means connected to said undervoltage sensitive means for transforming said control signal into a releasing signal in the form of a pulse of a certain predetermined duration, and for transmitting said pulse to said rectifier station.

3. Relay protection means according to claim 2; a feed back connection between said pulse generator means and the input side of said undervoltage sensitive means for transforming said releasing pulse into a prolonged pulse of a predetermined length; said prolonged pulse being connected to a blocking circuit in said undervoltage sensitive means; said feed back connection being connected to said blocking circuit.

4. Relay protection means according to claim 2; a holding circuit on the output side of said pulse generator; a counting device for counting the number of releasing pulses from said pulse generator; said counting device including means to supply a signal to said holding circuit after a number of releasing pulses; said holding circuit including means responsive to a signal from said counting device to transform said releasing pulse into a permanent releasing signal to said rectifier station.

5. Relay protection means according to claim 2; including further means inserted between the input side of said undervoltage sensitive means and said pulse generator means; said further means comprising signal storing means; switching means between said signal storing means and said pulse generator means; said switching means including means responsive to the voltage of said D.C. link for connecting said signal storing means to said pulse generator means if said voltage of said D.C. link falls below a predetermined limit; said switching means comprising delay means for the signal from said signal storing means.

References Cited
UNITED STATES PATENTS

| | | | |
|---|---|---|---|
| 3,036,257 | 5/1962 | Uhlmann | 317—31 X |
| 3,037,158 | 5/1962 | Schmidt | 321—14 |
| 3,310,727 | 3/1967 | Flannery | 317—31 X |
| 3,337,744 | 8/1967 | Johnson | 317—31 X |

JOHN F. COUCH, *Primary Examiner.*

J. D. TRAMMELL, *Assistant Examiner.*

U.S. Cl. X.R.

307—255; 317—43, 52; 321—47